United States Patent [19]

Tsumura et al.

[11] Patent Number: 5,241,033
[45] Date of Patent: Aug. 31, 1993

[54] METHOD FOR DECREASING CONTENT OF ALKOXY GROUPS IN ALKOXY CONTAINING ORGANOPOLYSILOXANE

[75] Inventors: Hiroshi Tsumura; Kiyoyuki Mutoh, both of Gunma; Kazushi Satoh, Tokyo; Ken-ichi Isobe, Gunma, all of Japan

[73] Assignee: Shin-Etsu Chemical Co., Ltd., Tokyo, Japan

[21] Appl. No.: 805,522

[22] Filed: Dec. 13, 1991

[30] Foreign Application Priority Data

Dec. 13, 1990 [JP] Japan .................................. 2-410418

[51] Int. Cl.$^5$ ................................................ C08G 77/08
[52] U.S. Cl. ........................................... 528/14; 528/21; 528/39; 556/469; 556/468
[58] Field of Search ................... 528/14, 21, 39; 556/469, 468

[56] References Cited

U.S. PATENT DOCUMENTS

| | | | |
|---|---|---|---|
| 2,634,284 | 4/1953 | Hyde | 528/21 |
| 4,238,590 | 12/1980 | Scholze et al. | 528/5 |
| 4,362,855 | 12/1982 | Millet et al. | 528/14 |
| 4,382,983 | 5/1983 | Yuyama et al. | 427/386 |
| 4,946,921 | 8/1990 | Shirahata et al. | 528/39 |
| 5,079,291 | 1/1992 | Evans | 524/725 |
| 5,086,145 | 2/1992 | Morimoto et al. | 528/14 |

OTHER PUBLICATIONS

Noll, *Chemistry and Technology of Silicones* 1968 pp. 226–229.
Lagowski, *The Chemistry of Nonaqueous Solvents* vol. 3 1970 pp. 12–17.

Primary Examiner—John C. Bleutge
Assistant Examiner—Margaret W. Glass
Attorney, Agent, or Firm—Millen, White, Zelano & Branigan

[57] ABSTRACT

A novel and efficient method is disclosed for decreasing the content of residual alkoxy groups in an organopolysiloxane such as so-called MQ resins, usually and unavoidably, having a considerable amount of residual alkoxy groups bonded to the silicon atoms to be very detrimental against practical application of the organopolysiloxane. The method comprises admixing the alkoxy-containing organopolysiloxane with a strongly alkaline compound such as alkali metal hydroxides as a catalyst, an aprotic polar solvent such as N,N-dimethyl formamide, dimethyl sulfoxide and the like and water each in a specified amount and heating the mixture, for example, under reflux so that the alkoxy groups are rapidly hydrolyzed and can be removed in the form of an alcohol.

9 Claims, No Drawings

METHOD FOR DECREASING CONTENT OF ALKOXY GROUPS IN ALKOXY CONTAINING ORGANOPOLYSILOXANE

BACKGROUND OF THE INVENTION

The present invention relates to a method for decreasing the content of alkoxy groups in an alkoxy-containing organopolysiloxane or, more particularly, to a method for decreasing the content of residual alkoxy groups in an organopolysiloxane having alkoxy groups bonded to the silicon atoms so as to give an organopolysiloxane with an extremely low content of residual alkoxy groups even when the organopolysiloxane comprises tetrafunctional siloxane units of the unit formula $SiO_2$ to be useful as a reinforcing agent of silicone rubbers.

Organopolysiloxanes called an MQ resin soluble in organic solvents consisting of monofunctional siloxane units of the formula $R_3SiO_{0.5}$, referred to as M units hereinbelow, in which R is a monovalent hydrocarbon group, and tetrafunctional siloxane units of the formula $SiO_2$, referred to as Q units hereinbelow, are well known in the art of silicones and are practically used in a variety of silicone products. Such an MQ resin is prepared by hydrolyzing a water-soluble basic silicate such as sodium orthosilicate or so-called water glass with addition of an inorganic acid such as hydrochloric and sulfuric acids to be converted into a silicic acid oligomer which is then reacted with a trialkyl chlorosilane (see, for example, U.S. Pat. Nos. 2,676,182 and 2,814,601). This method, however, has several disadvantages and problems due to the relatively low stability of the silicic acid oligomer as the intermediate that difficulties are encountered in reproducibly controlling the molecular weight distribution and the molar ratio of the M units and Q units not to give a product as desired. The stability of the silicic acid oligomer can be improved by admixing the reaction mixture with a large amount of an alcohol but the organopolysiloxane obtained by this method unavoidably contains a substantial amount of alkoxy groups bonded to the silicon atoms so that the MQ resin is not always satisfactory for several applications.

Alternatively, organopolysiloxanes of this kind can be prepared by a method disclosed in U.S. Pat. No. 2,857,356, in which an alkyl silicate and a trialkyl chlorosilane are co-hydrolyzed in the presence of hydrochloric acid or by a method disclosed in Japanese Patent Kokai 61-195129, in which a hexaalkyl disiloxane or a trialkyl chlorosilane is reacted with an alkyl silicate or a partial hydrolysis product thereof in the presence of an aqueous hydrochloric acid. These methods are advantageous as compared with the above described method in respect of the relatively good reproducibility of the molar ratio of the M units to the Q units and the molecular weight distribution in the organopolysiloxane product. A problem in these methods again consists in the large amount of the residual alkoxy groups bonded to the silicon atoms because a large amount of an alcohol is produced from the starting materials in the course of the reaction or addition of an alcohol to the reaction mixture is necessary in order to ensure smooth proceeding of the reaction.

A further alternative method has been recently disclosed in Japanese Patent Kokai 63-256628, according to which an organosilane compound or an organopolysiloxane is reacted with an alkyl silicate or a partial hydrolysis product thereof in the presence of a sulfonic acid group-containing compound and/or phosphonitrile chloride as a catalyst. This method is also disadvantageous due to the residual alkoxy groups in the organopolysiloxane product although good reproducibility can be obtained in the control of the M:Q molar ratio and molecular weight distribution.

As is described above, none of the prior art methods is quite satisfactory in respect of the residual content of the alkoxy groups in the organopolysiloxane product greatly affecting the inherently excellent weatherability and thermal stability of silicone products in general. In addition, the residual alkoxy groups are subject to the condensation reaction taking place in the lapse of time decreasing the stability of the organopolysiloxane. As a consequence, the MQ resins prepared by the prior art method cannot be very effective as a reinforcing agent of silicone rubbers.

As a means to decrease the content of alkoxy groups in the organopolysiloxane, it would be a possible way that the reaction mixture for the preparation of the organopolysiloxane is admixed with an excess amount of water so as to accelerate the hydrolysis reaction of the alkoxy groups. This method, however, is not practical because the decrease in the content of the alkoxy groups by this method cannot be high enough even after a prolonged reaction time.

SUMMARY OF THE INVENTION

The present invention accordingly has an object, in view of the above described problems and disadvantages in the prior art methods, to provide a method for greatly and efficiently decreasing the content of residual alkoxy groups in an alkoxy-containing organopolysiloxane or to prepare an organopolysiloxane or an MQ resin comprising the Q units of which the content of residual alkoxy groups is greatly decreased.

Thus, the method of the present invention for decreasing the content of residual alkoxy groups in an organopolysiloxane having alkoxy groups bonded to the silicon atoms comprises the steps of:

(a) admixing the organopolysiloxane containing alkoxy groups bonded to the silicon atoms with water, a strongly alkaline compound as a catalyst and an aprotic polar solvent to form a mixture; and (b) heating the mixture.

After the above mentioned process, the reaction mixture is freed from volatile matter, i.e. water, the aprotic polar solvent and the alcohol produced by the condensation reaction of the alkoxy groups and the alkaline catalyst, to give an organopolysiloxane in which the content of residual alkoxy groups is greatly decreased.

If necessary, the reaction mixture after removal of the volatile matter or, in particular, the alcohol is again admixed with water and the reaction mixture is again heated so that removal of the alkoxy groups can be more complete. It is of course that this procedure consisting of removal of the by-product alcohol from the reaction mixture, admixing the reaction mixture with a fresh portion of water and heating of the reaction mixture can be repeated as many times as desired until the content of the residual alkoxy groups is decreased extremely low to meet the requirement for the specific application of the organopolysiloxane product.

DETAILED DESCRIPTION OF THE PREFERRED EMBODIMENTS

As is described above, the scope of the inventive method consists in a heating treatment of an alkoxy-containing organopolysiloxane in the presence of water, an alkaline compound as a catalyst and an aprotic polar solvent.

Although the inventive method can be applied quite satisfactorily to the so-called MQ resins, the alkoxy-containing organopolysiloxane as the objective material of the inventive method is not particularly limitative in respect of the types and molar ratios of the siloxane units forming the organopolysiloxane. The content of the residual alkoxy groups in the organopolysiloxane is also not limitative. It is of course optional that the inventive method is applied to a mixture of two kinds or more of organopolysiloxanes which are different in the types and molar ratios of the siloxane units, molecular weight distribution, contents of the residual alkoxy groups and the like. Mixtures of an alkoxy-containing organopolysiloxane with another organopolysiloxane free from alkoxy groups, e.g., hexamethyl disiloxane, can also be successfully treated by the inventive method. Further, the inventive method is applicable to a mixture of an alkoxy-containing organosilane compound and an alkoxy-containing or alkoxy-free organopolysiloxane in the siloxane rearrangement reaction to produce an equilibrated organopolysiloxane. For example, the MQ resin as a reinforcing agent of silicone rubbers is prepared by using a tetraalkoxy silane compound such as methyl silicate, ethyl silicate and the like or a partial hydrolysis product thereof as the starting material to provide the Q units in combination with other source materials to provide the M units.

The strongly alkaline compound used as the catalyst in the inventive method is exemplified by alkali metal hydroxides, alkali metal siliconates and amino compounds. These alkaline compounds can be used either singly or as a combination of two kinds or more according to need. The amount of the alkaline catalyst admixed with the alkoxy-containing organopolysiloxane is in the range from 0.01 to 1.0 part by weight or, preferably, from 0.05 to 0.2 part by weight per 100 parts by weight of the organopolysiloxane.

The aprotic polar solvent admixed with the alkoxy-containing organopolysiloxane in the inventive method is exemplified by N,N-dimethyl formamide, dimethyl sulfoxide, tetrabutyl phosphonyl bromide and hexamethyl phosphoramide. These aprotic polar solvents can be used either singly or as a combination of two kinds or more according to need. The amount of the aprotic polar solvent admixed with the alkoxy-containing organopolysiloxane to be treated is in the range from 0.1 to 10 parts by weight or, preferably, from 1 to 5 parts by weight per 100 parts by weight of the organopolysiloxane.

The amount of water admixed with the alkoxy-containing organopolysiloxane is in the range from 10 to 500% by weight or, preferably, from 10 to 100% by weight based on the amount of the aprotic polar solvent.

It is optional according to need that the mixture of the alkoxy-containing organopolysiloxane with water, an alkaline catalyst and an aprotic polar solvent is further admixed with another organic solvent which is exemplified by aliphatic hydrocarbon solvents such as n-hexane and the like and aromatic hydrocarbon solvents such as benzene, toluene, xylene and the like.

The method of the present invention can be performed by introducing the alkoxy-containing organopolysiloxane together with water, an alkaline catalyst and an aprotic polar solvent into a reaction vessel equipped with a stirrer and a temperature-controlling means and heating the mixture in the vessel at an elevated temperature under agitation. Although the reaction can proceed even at room temperature, it is advantageous to accelerate the reaction by heating the mixture at an elevated temperature. It is sometimes advantageous that the mixture in the vessel is heated under reflux. The time taken for completion of the reaction naturally depends on the temperature but the reaction is usually complete within 0.1 to 10 hours or, in most cases, within 0.3 to 2 hours. After completion of the reaction, the mixture is freed and purified from the excess amount of water, solvent and the alcohol produced as a by-product by the condensation reaction of the alkoxy groups as well as other impurities by a known method including distillation or, if necessary, filtration to give an organopolysiloxane product having residual alkoxy groups in a greatly decreased content.

When further decrease is desired in the content of the residual alkoxy groups in the thus obtained organopolysiloxane, the reaction mixture after removal of the volatile matter or, in particular, the by-product alcohol is again admixed with a fresh portion of water and the mixture is heated under agitation. The conditions for this second heating treatment can be the same as described above including, for example, the reaction temperature to effect refluxing over the reaction mixture. If desired, the process consisting of the steps of removal of the by-product alcohol, addition of a fresh portion of water and heating of the mixture is repeated as many times as desired until the content of the residual alkoxy groups is decreased to such a level that the organopolysiloxane product can be used satisfactorily in the intended application.

In the following, the method of the invention is illustrated in more detail by way of examples and comparative examples, in which the term of "parts" always refers to "parts by weight".

EXAMPLE 1

Into a reaction vessel equipped with a stirrer, thermometer and reflux condenser was introduced a 50% by weight xylene solution of a solid organopolysiloxane expressed by an average unit formula $[(CH_3)_3SiO_{0.5}]_{0.85}$-$[SiO_2]$ and containing 0.084 mole/100 g of residual methoxy groups in an amount of 800 parts together with 0.8 part of potassium hydroxide, 32 parts of dimethyl sulfoxide and 8 parts of water.

The mixture in the reaction vessel was heated up to 127° C. to start refluxing and heating was continued thereafter for 1 hour under reflux. The refluxing temperature at the end of this period was decreased to 124.5° C. A portion of the mixture in the vessel was taken and analyzed to find that the content of methoxy groups in the organopolysiloxane was decreased to 0.017 mole/100 g.

Thereafter, the reflux condenser of the reaction vessel was replaced with a distillation cooler and the mixture in the vessel was subjected to distillation so as to remove the volatile matter having a boiling point up to 127° C. The mixture in the vessel after cooling to 100° C. or below was admixed with 4 parts of fresh water and again heated under reflux for a period of 1 hour, during which the refluxing temperature was decreased to 126.5° C. The content of residual methoxy groups in the thus obtained organopolysiloxane was 0.008 mole/100 g.

COMPARATIVE EXAMPLE 1

A reaction mixture was prepared from the same methoxy-containing organopolysiloxane and the same amounts of potassium hydroxide and water as in Example 1 described above but with omission of dimethyl sulfoxide.

The mixture in the reaction vessel was heated up to the refluxing temperature of 119° C. and heating of the mixture was continued for 10 hours under reflux. The refluxing temperature was decreased to 118° C. at the end of this period. A small portion of the mixture was taken and analyzed to find that the content of the residual methoxy groups in the organopolysiloxane was decreased to 0.054 mole/100 g.

Thereafter, the mixture in the vessel was subjected to distillation so as to remove the volatile matter having a boiling point up to 138° C. The mixture after cooling to 100° C. or below was admixed with 4 parts of fresh water and again heated under reflux at a temperature of 122° C. for 10 hours. The refluxing temperature was unchanged throughout this period. The content of residual methoxy groups in the thus obtained organopolysiloxane was 0.051 mole/100 g.

EXAMPLE 2 AND COMPARATIVE EXAMPLES 2 AND 3

In Example 2, a 60% by weight toluene solution of a solid organopolysiloxane expressed by the average unit formula $[(CH_3)_3SiO_{0.5}]_{0.8}[SiO_2]$ and having 0.137 mole/100 g of ethoxy groups in an amount of 800 parts was introduced into a reaction vessel similar to that used in Example 1 together with 1 part of sodium hydroxide, 40 parts of N,N-dimethyl formamide and 10 parts of water to form a reaction mixture which was heated under reflux for up to 20 hours. A small portion of the reaction mixture was taken periodically during this period and analyzed for the content of the residual ethoxy groups in the organopolysiloxane to give the results shown in Table 1 below.

The procedure in Comparative Example 2 was just the same as in Example 2 described above excepting omission of N,N-dimethyl formamide in the reaction mixture. Further, the procedure in Comparative Example 3 was the same as in Example 2 excepting omission of N,N-dimethyl formamide and replacement of 1 part of sodium hydroxide with the same amount of sulfuric acid. Table 1 includes also the results of the analysis in these comparative examples for the content of residual ethoxy groups in the organopolysiloxane periodically taken from the reaction mixture.

TABLE 1

| | Content of ethoxy groups, moles/100 g, after reaction of | | | | |
|---|---|---|---|---|---|
| | 1 hour | 2 hours | 4 hours | 10 hours | 20 hours |
| Example 2 | 0.062 | 0.059 | 0.054 | 0.052 | 0.050 |
| Comparative Example 2 | 0.096 | 0.091 | 0.090 | 0.090 | 0.089 |
| Comparative Example 3 | 0.114 | 0.112 | 0.110 | 0.110 | 0.108 |

EXAMPLE 3

Into a reaction vessel similar to that used in Example 1 was introduced a 60% by weight xylene solution of a solid organopolysiloxane expressed by the average unit formula $[(CH_2=CH)(CH_3)_2SiO_{0.5}]_{0.2}[(CH_3)_3SiO_{0.5}]_{0.7}[SiO_2]$ and containing 0.129 mole/100 g of ethoxy groups in an amount of 800 parts together with 0.5 part of cesium hydroxide, 30 parts of hexamethyl phosphoramide and 10 parts of water to form a reaction mixture. The mixture was heated up to the refluxing temperature of 125° C. and heating was continued for 1 hour under reflux. The refluxing temperature was decreased to 121.5° C. at the end of this reaction time. A small portion of the reaction mixture was taken and analyzed to find that the content of the residual ethoxy groups was 0.031 mole/100 g of the organopolysiloxane.

In the next place, the reaction mixture in the vessel was subjected to distillation to remove the volatile matter having a boiling point up to 130° C. After cooling to 100° C. or below, the reaction mixture was admixed with 5 parts of fresh water and heated under reflux for 1 hour. The refluxing temperature was decreased to 126° C. at the end of this period. A small portion of the mixture was taken and analyzed to find that the content of the residual ethoxy groups was decreased to 0.015 mole/100 g of the organopolysiloxane.

The above described procedure including the steps of removal of the volatile matter, addition of fresh water and heating of the mixture under reflux was again repeated. The refluxing temperature at the end of the heating treatment under reflux was 128° C. and the content of the residual ethoxy groups in the thus obtained organopolysiloxane was 0.007 mole/100 g.

COMPARATIVE EXAMPLE 4

The experimental procedure was just the same as in the above described Example 3 including the heating treatment of the mixture repeated three times each for 1 hour under reflux excepting omission of the hexamethyl phosphoramide in the charge into the reaction vessel. The refluxing temperature at the beginning of the first time heating treatment under reflux was 122° C. while the refluxing temperature at the end of the 1 hour period of the first, second and third heating treatments under reflux was 117° C., 120° C. and 120° C., respectively. The contents of the residual ethoxy groups in the organopolysiloxane taken from the reaction mixture at the end of the first, second and third heating treatments under reflux were 0.081, 0.060 and 0.056 mole/100 g, respectively.

What is claimed is:

1. A method for decreasing the content of residual alkoxy groups in an organopolysiloxane having alkoxy groups bonded to the silicon atoms which comprises the steps of:
   (a) admixing the organopolysiloxane having alkoxy groups bonded to the silicon atoms with a strongly alkaline compound, an aprotic polar solvent, and water to form a mixture; and
   (b) heating the mixture so as to remove alkoxy groups and form alcohol, wherein the amount of said aprotic polar solvent is in the range of from 0.1 to 10 parts by weight per 100 parts by weight of the organopolysiloxane and the amount of said water is in the range of 10–500% by weight of the aprotic solvent.

2. The method for decreasing the content of alkoxy groups in an organopolysiloxane as claimed in claim 1 in which the strongly alkaline compound is selected from the group consisting of alkali metal hydroxides, alkali metal siliconates and amino compounds.

3. The method for decreasing the content of alkoxy groups in an organopolysiloxane as claimed in claim 1 in which the amount of the strongly alkaline compound is in the range from 0.01 to 10 parts by weight per 100 parts by weight of the organopolysiloxane.

4. The method for decreasing the content of alkoxy groups in an organopolysiloxane as claimed in claim 1 in which the aprotic polar solvent is selected from the group consisting of N,N-dimethyl formamide, dimethyl sulfoxide, tetrabutylphosphonyl bromide and hexamethyl phosphoramide.

5. The method for decreasing the content of alkoxy groups in an organopolysiloxane as claimed in claim 1 in which the amount of the aprotic polar solvent is in the range from 1 to 5 parts by weight per 100 parts by weight of the organopolysiloxane.

6. A method for decreasing the content of alkoxy groups in an organopolysiloxane as in claim 1, in which the aprotic polar solvent is dimethyl sulfoxide.

7. A method according to claim 1, wherein the organopolysiloxane to be treated is a solid.

8. A method according to claim 1, further comprising the steps of removing said alcohol from the mixture, adding additional water to the mixture, and heating the resultant mixture to remove additional alkoxy groups.

9. A method according to claim 1, wherein the reaction is completed within 0.3 to 2 hours.

* * * * *